United States Patent [19]

Andrá et al.

[11] Patent Number: 4,562,101
[45] Date of Patent: Dec. 31, 1985

[54] SHIRRED SAUSAGE CASING AND PROCESS FOR ITS PRODUCTION

[75] Inventors: Klaus Andrá, Zornheim; Elfriede Hutschenrüter, Bad Schwalbach; Horst-Erich Besier, Taunusstein, all of Fed. Rep. of Germany

[73] Assignee: Hoechst Aktiengesellschaft, Frankfurt am Main, Fed. Rep. of Germany

[21] Appl. No.: 489,594

[22] Filed: Apr. 28, 1983

[30] Foreign Application Priority Data

May 3, 1982 [DE] Fed. Rep. of Germany ....... 3216437

[51] Int. Cl.$^4$ ...................... F16L 11/00; A22C 13/00
[52] U.S. Cl. .................................. 428/36; 138/118.1; 426/105; 426/135; 426/140
[58] Field of Search ....................... 138/118.1; 428/36; 426/105, 135, 140, 412–414; 17/42

[56] References Cited

U.S. PATENT DOCUMENTS

| 2,573,956 | 11/1951 | Daniel et al. | 117/76 |
|---|---|---|---|
| 2,819,488 | 1/1958 | Gimbel | 17/42 |
| 2,926,154 | 2/1960 | Keim | 260/29.2 |
| 3,378,379 | 4/1968 | Shiner et al. | 99/176 |
| 3,546,209 | 12/1970 | Lipps, Jr. | 260/214 |
| 3,594,857 | 7/1971 | Michl | 17/42 |
| 3,619,854 | 11/1971 | Ilgen et al. | 17/42 |
| 3,766,603 | 10/1973 | Urbutis et al. | 17/42 |
| 3,884,270 | 5/1975 | Rasmussen et al. | 138/177 |
| 3,986,230 | 10/1976 | Riegler | 17/42 |
| 3,988,804 | 11/1976 | Regner et al. | 17/45 |
| 4,185,358 | 1/1980 | Regner et al. | 138/118.1 |
| 4,401,135 | 8/1983 | Andrä et al. | 428/36 |
| 4,401,136 | 8/1983 | Porrmann et al. | 428/36 |

FOREIGN PATENT DOCUMENTS

| 1288944 | 2/1969 | Fed. Rep. of Germany . |
|---|---|---|
| 865727 | 4/1961 | United Kingdom . |
| 908205 | 10/1962 | United Kingdom . |

OTHER PUBLICATIONS

Agster, Andreas, "Faerberei- und Textilchemische Untersuchungen", Sprnger-Verlag, Berlin, 1956.

Primary Examiner—John E. Kittle
Assistant Examiner—James J. Seidleck
Attorney, Agent, or Firm—Schwartz, Jeffery, Schwaab, Mack, Blumenthal & Evans

[57] ABSTRACT

Disclosed is a shirred sausage casing of a web film in the form of a tubing which comprises a seam region, formed from the edge regions of the web film, which extends in a helically twisted manner about the longitudinal axis of the casing in a manner wherein more than 10 helical turns are present in a 10 m length of the casing. Also disclosed is a process for producing a casing of this type.

15 Claims, 5 Drawing Figures

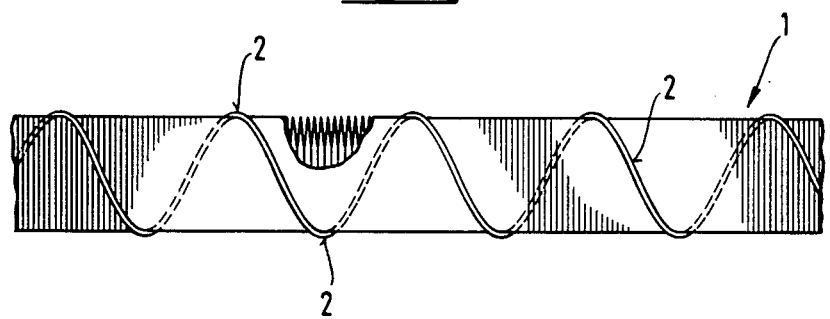
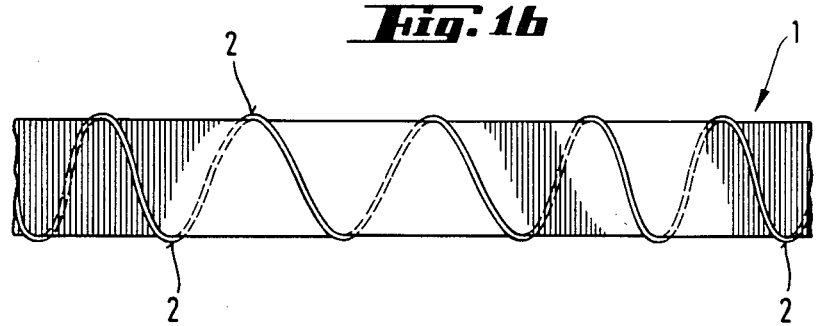

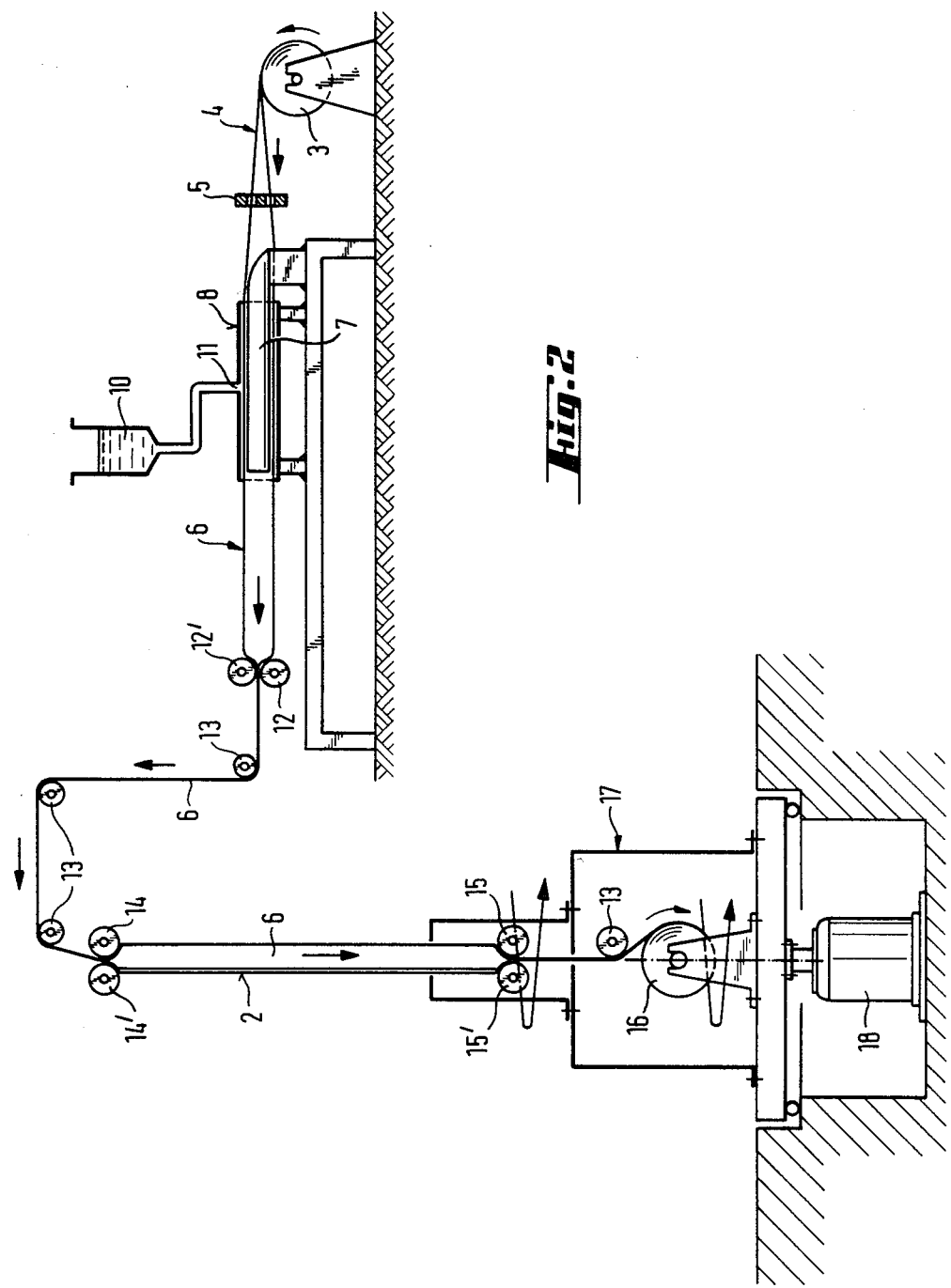

SHIRRED SAUSAGE CASING AND PROCESS FOR ITS PRODUCTION

BACKGROUND OF THE INVENTION

The present invention relates to a shirred sausage casing and a process for its manufacture. In particular, the invention relates to a shirred sausage casing having a seam region which is helically twisted about said casing to provide improved casing properties.

The formation of a shirred tubular casing having one or several seams running along the longitudinal axis of the casing, wherein the edge regions of the edge zones running along the longitudinal axis are glued to one another, is described, for example, in European patent application No. 0,037,543. In connection with the teachings of U.S. Pat. Nos. 3,988,804 and 4,185,358, this publication describes a device which is used for shirring sausage casings possessing areas of increased thickness in the form of glued seams. By means of this particular shirring device, the tubular casing is automatically twisted during the shirring of the casing. According to the procedure, the glued seam zone of a tubular casing is arranged, in a helically wound manner, about the longitudinal axis of the shirred tubular casing. However, the process results in the casing having less than 10 helical turns of the seam zone per 10 m of tube length. Such a ratio, which reflects the desire for a high shirring ratio, is insufficient for present needs. Moreover, it is impossible in this way to achieve a reproducible lead of the helically wound seam zone. Also, the hollow space in the interior of the concertinaed tubing does not have a circular cross section, due to the fact that at least part of the relatively thick seam zone is displaced into the hollow space during shirring.

It has also been proposed, for example in European patent application No. 81 109 120.6, to twist a sausage casing with a glued seam helically during shirring by using a shirring device in accordance with any of U.S. Pat. Nos. 2,819,488, 3,619,854, 3,594,857 or 3,766,603. The number of turns per 10 m of tube length varies between 0.5 and 10. More than 10 turns per 10 m of tube length cannot be achieved by helically twisting the tube during shirring. When internal or external tangentially acting forces are applied to the concertinaed tubing, producing a rotary movement of the tubing relative to the mandrel, the danger that the tubular casing may be damaged due to the strain exerted on it is relatively great and, therefore, a complicated shirring technique is required.

SUMMARY OF THE INVENTION

It is therefore an object of the present invention to provide an improved shirred sausage casing exhibiting a significantly increased density in the seam region, in addition to a uniform, straight internal cavity of a circular cross section and a relatively smooth inner wall.

Another object of the present invention is to provide a shirred casing which can be easily fit onto the stuffing horn of a stuffing machine, having a relatively large diameter.

Yet another object of the present invention is to provide a shirred sausage casing which provides quick and economical stuffing with sausage mixtures.

Still another object of the present invention is the provision of a process for producing a shirred casing of the kind described above.

In accomplishing the foregoing objects, there has been provided in accordance with one aspect of the present invention a shirred sausage casing, comprising a circular cylindrical casing of a web film having a seam region formed from the edge regions of the web film, comprising an adhesive layer and extending in a helically twisted manner about the longitudinal axis of the shirred casing, wherein the number of helical turns of the seam region is greater than 10 turns per 10 m of tube length.

In another embodiment of the invention, the casing comprises an internal hollow space having a circular cross section and the helically twisted seam region protrudes outwardly from the outside surface of the casing.

In accordance with another aspect of the present invention, there has been provided a process for the production of a shirred casing, comprising the steps of forming a web film into a tubing by bending the edge regions of the film along the film's longitudinal axis, bonding the edge regions of the formed tubing, helically twisting the tubing, winding the tubing in the helically twisted state, unwinding the helically twisted tubing and simultaneously passing the tubing in the helically twisted state to a shirring mandrel supplied with an internal gas pressure, and pressing the tubing against a stop of the shirring mandrel to form the shirred casing.

Advantageously, the shirred sausage casing of the present invention, despite its relatively thick glued seam, can be shirred to produce a relatively dense packing and, at the same time, to possess a substantially uniform outer circumference and a substantially uniform, circular inner circumference. The hollow space of the shirred tubing or "stick" is straight and has an essentially smooth inner wall, despite the thickness in the area of the glued seam. The process can be performed with relative ease and without any constructural changes to the shirring device. By means of this process, it is surprisingly possible to displace the relatively thick seam zone to the outer surface of the shirred tubular casing, so that the shirred tubings can be pushed onto stuffing horns having relatively large diameters and can be uniformly unshirred and drawn from the stuffing horn during stuffing without any problems.

Further objects, features and advantages of the present invention will become apparent from the Detailed Description of Preferred Embodiments which follows, when considered together with the attached figures of drawings.

BRIEF DESCRIPTION OF THE DRAWINGS

In the drawings:

FIGS. 1a and 1b are partial views of two exemplary embodiments of the shirred sausage casing;

FIG. 2 is a schematic view illustrating a process for producing a tubing from a web and for winding the twisted tubing;

DETAILED DESCRIPTION OF PREFERRED EMBODIMENTS

Figure 3:
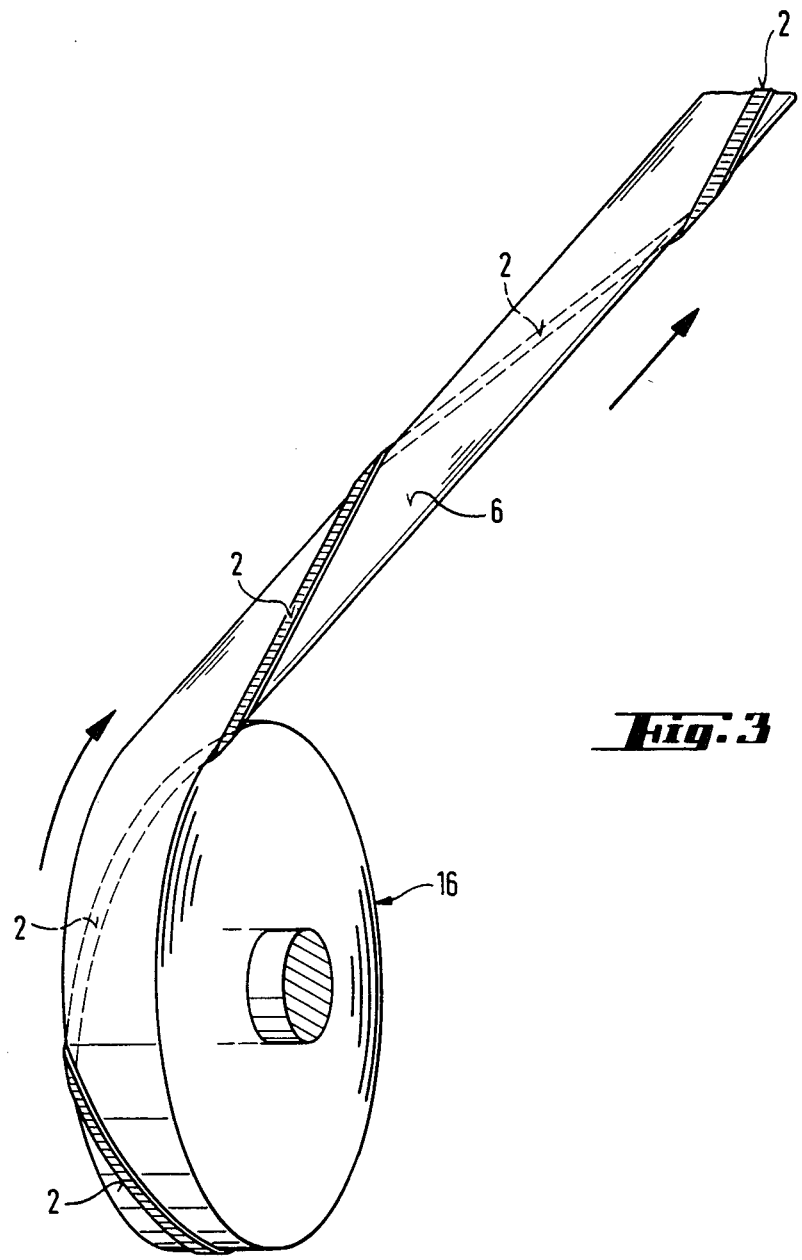
FIG. 3 is a perspective view illustrating the wound tubing of FIG. 4.

According to the present invention, a sheet-like or web-like rectangular precut film, curved around its longitudinal axis, or a correspondingly curved continuous film web, for example, a cellulose web, which optionally has an anchoring agent for the adhesive on its surface, is a preferred starting material. The film is converted into a tubular casing having a bonding seam running parallel to the longitudinal axis, by overlapping and gluing the edge regions running along the longitudinal axis with a solution or dispersion containing an adhesive. For simplicity, in order to indicate "sheet-like or web-like cut pieces" and "continuous webs", only the term "webs" is used in the following text. In the overlapping region, the adhesive-containing layer is applied to the web or to the anchoring layer, if present, in the form of a solution or dispersion. It is also possible for the edge zones to be bonded to one another in such a way that the edges are brought together flush, i.e., with the edges at least essentially abutting, and then bonded to one another by means of a tape, film strip or foil strip which covers both edge zones. The particular bonding strip will be generally referred to as a "film strip" in the following text for the sake of simplicity. The film strip may be present on either the outside or inside surface of the tubular casing, or on both surfaces in a parallel manner to one another along the longitudinal axis of the tubing. One or several film strips can also be used if the edge zones overlap. Immediately before the bonding, the adhesive layer, in the form of a solution or a dispersion, is applied to the edge zones of the web, and/or, if appropriate, to the surfaces of the film strip. Exemplary applicators include a nozzle or an applicator roll.

The film strip typically has a width of about 5 to 15 percent of the tubing circumference and preferably is composed of the same material as the tubular casing, preferably smoke-permeable cellulose. Also the film strip may be fiber-reinforced and may exhibit strength values in the longitudinal and transverse directions within the same range as those of the tubing material. If, however, no particular importance is attached to a curvature-free form of the tubular casing, it is possible to use a film strip of paper or of plastic, a composite film, a web or nonwoven fabric, a foamed film, or a microporous film or membrane. Likewise, tapes of fabric, network or lattice are also suitable as film strips for bonding the edge zones.

However, compact film strips, which are advantageously composed of a smoke-permeable material, in particular the above-mentioned film strip of cellulose, and which may have a fiber-reinforcing, are preferred. The film strip may also serve as a tear-open tab for the stuffed tubular casing, in particular for sausage casings, which can be drawn off the contents without difficulty.

The forming of the web to produce a tubing is carried out, for example, either on a sufficiently long path or by deflection over a shoulder-like forming tool, as described in the above-mentioned European patent application.

Preferred base materials used for the production of the tubular casing include webs of cellulose, e.g., transparent cellulose film, regenerated cellulose or cellulose hydrate, preferably reinforced with a fiber insert, of the type customarily used in the packaging of foodstuffs, and, in particular, as in the packaging of sausage. Preferred webs include those cellulose webs which have been manufactured by the viscose process, described, for example, in U.S. Pat. No. 3,884,270, by denitration of cellulose nitrate or by hydrolysis of other cellulose esters, for example, by deacetylation of cellulose acetate, with an aqueous or alcoholic alkali solution which is described, for example, in U.S. Pat. No. 3,546,209.

For simplicity, only cellulose webs will be discussed below. The manufacture of cellulose webs, which may be fiber-reinforced, as well as the manufacture of coatings of anchoring agents, are known. For example, European patent application No. 0,037,543 describes a process for preparing cellulose of this type.

Anchoring agents or adhesion promoters for adhesives are also known and are to be understood as substances or substance mixtures which are applied to one or both of the gluing surfaces before application of the adhesive in order to improve the adhesion of the adhesive and the gluing surfaces. In the present case, the optionally used adhesion-promoter has the object of anchoring the adhesive layer on the web and/or film strip in a wet-resistant manner. The anchoring agent, which is preferably a water-insoluble, thermoset, cationic resin, is located between the adhesive layer and the web surface or between the adhesive layer and the surface of the film strip. Polyurethane resins, nitrocellulose and other compounds, known as water-insoluble anchoring agents, can likewise be used. These adhesion-promoting resins and their application to the film web are described in detail in the above-noted European patent application.

In addition, the surface of the web which forms the inside of the tubular casing can also be treated with a conventional agent to improve the ease of peeling the tubular casing from its contents.

Before gluing, the web can be printed with labels or decorative patterns. In addition to the printing processes customary in the manufacture of seamless sausage casings, other printing processes can also be used since, in the present case, it is not necessary to print onto the formed tube, but instead the printing can be applied to the flat web before the web is shaped into a tube.

A particularly preferred adhesive according to the present invention is a cationic resin which is applied in a solution or dispersion in a water-soluble form to the edge zones of the cellulose web, which are to be bonded to one another, immediately before or during the formation of the tube. The thickness of the wet adhesive layer ranges from about 5 to 20 $\mu$m. If a film strip is used for bonding the edge zones of the cellulose web, the solution or dispersion is applied to the film strip and/or to the edge zones of the cellulose web. The adhesive is applied to both sides of the film strip, if the film strip is arranged in the overlapping region between the edge zones of the cellulose web.

An organic solvent or dispersing agent or a mixture is used for the adhesive. Preferably the adhesive is applied in an aqueous solution of about 5 to 20 percent, in particular about 10 to 15 percent, by weight adhesive. For simplicity, only the expression "adhesive solution" will be used in the following text.

Examples of cationic resins which may be used as the adhesive include urea/formaldehyde resins, melamine/-formaldehyde resins and phenol/formaldehyde resins. These resins are present in solutions in an uncured state, but are converted into a cured, water-insoluble state during storage at room temperature. The conversion may proceed with the aid of a catalyst, if appropriate.

In a preferred embodiment, the resins are cured at room temperature in the alkaline range, for example, by adding a concentrated ammonia solution. Further cationic resins which may be used as adhesives are described in U.S. Pat. No. 3,378,379, the disclosure of which is incorporated herein by reference.

Particularly preferred adhesives are condensation products of aliphatic polyamines or polyamides, in particular of a polyamide-polyamine, with bifunctional halohydrins or derivates thereof, such as, for example, epichlorohydrin, described, for example, in U.S. Pat. Nos. 2,926,154 and 2,573,956 or in British Pat. Nos. 865,727 and 908,205. The reaction product of an aliphatic 2,6-polyamide, diethylenetriamine and epichlorohydrin is a particularly suitable resin.

The total width of the adhesive solution applied depends on the desired strength values and the circumference of the tubular casing, as well as on the wet layer thickness of the adhesive solution applied. Usually, the total width of the adhesive applied will be between about 1 and 15 mm, in particular between about 2 and 3 mm, the latter range representing only a few percent of the circumference of the tubular casing. If a film strip is used for an overlapping joint of a butt seam formed by the edge zones, the width of adhesive solution application is doubled.

The adhesive solution is applied within the desired gluing region only, i.e., along the two edges running parallel to the longitudinal axis and/or on the surface of the film strip.

The surface of the cellulose web onto which the adhesive solution is applied is in the dried or re-moistened state and, if appropriate, already carries the above-described anchoring agent layer.

After the adhesive solution has been applied, for example, by means of rollers or spray nozzles, the bonding seam is formed by mutually overlapping the film strip with the edge zones of the cellulose web or by mutually overlapping the edge zones of the cellulose web. The solvent or dispersing agent can be removed by careful heating with hot air or infrared radiators. Preferably, however, heating is not used, since it can lead to embrittlement of the cellulose material.

Preferably, the solvent or dispersing agent is removed, and the resin is cured, by subsequent storage at room temperature for a period of about 1 to 3 days. Due to the curing of the resin, which takes place during storage, the overlapping edge zones of the cellulose web are bonded to one another or, respectively, to the film strip. A layer thickness of the adhesive corresponding to a weight per unit area within the range from about 0.5 to 10 g/m$^2$ is generally sufficient. The usual thickness of the adhesive layer corresponds to a weight per unit area of from about 1 to 3 g/m$^2$, with a total width of the adhesive layer of about 1 to 15 mm. After storage, the tubular casing has a moisture content of about 4 to 15 percent, in particular about 7 to 10 percent by weight.

The adhesive layer and/or the anchoring agent layer may also contain further additives, for example, wetting agents, softeners, fillers, such as kaolin, glass beads, chalk, quartz powder, microdolomite, barite, fine-grained sand, zinc oxide and pigments, as well as agents to protect this layer or the tubular casing from attack by micro-organisms, and organic and inorganic dyes, for example, in the form of powder or flakes, by which the twisting of the casing is rendered optically perceivable, both during the winding process and when the casing is in the shirred state. When the sausage casing is used as a peel-off casing, the colored markings incorporated in the helically wound adhesive layer allow an easy control in determining whether the casing has been completely peeled from the sausages.

It has been found that the tear-resistance values of glued seams, comprising the preferred anchoring agent and adhesive, are as high as, or even higher than, the tear-resistance values of the cellulose material. If an adhesive according to European patent application No. 0,037,543 is used, storage of the casing prior to shirring is not required.

It is an essential characteristic of the process of the invention that the casing is twisted prior to shirring. This is preferably effected by first twisting the casing and then winding the twisted casing on a roll, from which the twisted casing is passed to the shirring device. It is particularly advantageous to twist the casing during its production, immediately after forming the seam, and to wind flatly the twisted casing. In other words, the endless web is formed in a concentric manner, a glued seam is formed by gluing the edge zones of the endless web, thus forming the tubular casing, the casing is immediately twisted, laid flat and then wound onto a roll.

A suitable device for the above procedure comprises, for example, a first pair of draw rollers, which draw the glued casing from the gluing station, and a second pair of draw rollers, which rotate about the longitudinal axis of the casing, thereby twisting the casing as it leaves the second pair of draw rollers. Between the two pairs of draw rollers, the tubing is inflated with a supporting gas and kept in this inflated state.

In the gap between the second pair of draw rollers, the casing is simultaneously laid flat. To avoid the formation of creases in those tubings having a relatively great diameter, for example, 120 mm, elements may be provided near the gap between the rolls, by which the tubing is steadily flattened, and thus, gradually laid flat before reaching the gap between the draw rollers. These elements may, for example, be converging templets, gravity-roller conveyors, conveyor belts or guide rollers, such as are customary, for example, in the production of extruded plastic tubings. All elements used for twisting, laying flat, and winding rotate at identical speeds about the longitudinal axis of the casing. Therefore, these parts are advantageously arranged on a common support which rotates, and may also be part of the tube-forming equipment.

The degree to which the tubular casing, and thus the glued seam, is twisted, is determined by the speed of rotation of the above elements or, respectively, of the support and by the speed at which the tubing is advanced.

If the casing is, for example, advanced at a speed of 5 m/min, or, if a tube is formed from the web at this speed, and the number of revolutions of the twisting elements is 5 per minute, the number of turns of the casing per 10 m tubing length is 10. If the advance speed of the casing is 200 m/min and the number of rotations is 200 per minute, the number of turns per 10 m tubing length is also 10. If the shirring ratio is, for example, 100:1, and the number of turns is 10 per 10 m tubing length, the distance between two helical turns on the shirred tubing is 1 cm. Likewise, if the shirring ratio is 50:1 and the number of turns is 10 per 10 m tubing length, the distance between two helical turns is 2 cm. An optimum shirring is obtained by means of this process, when the number of turns per 10 m tubing length exceeds 10, i.e., when the distance between two helical turns on the shirred tubing is less than 1 cm and the shirring ratio is higher than 100:1. Correspondingly, if the shirring ratio is higher than 50:1, the distance between two helical turns is less than 2 cm. This optimum number of turns per 10 m tubing length is obtained by appropriately adapting the advance speed of the casing to the speed of rotation, the preferred range of the advance speed of the casing being between about 5 and 200 m/min and the preferred speed of rotation being between about 5 and 200 rpm. The adaption of the advance speed of the casing to the speed of rotation is determined by the quotient of the speed of rotation (rpm) and the advance speed of the casing (m/min). This quotient (revolutions/m) is preferably greater than 1 but not greater than 4. With these values, optimum shirrings are obtained from casings having a glued seam.

By varying the ratio of speed of rotation to advance speed of the casing, any other lead of the glued seam, i.e., any other number of turns of the casing per unit length can be set. Further, periodic variations of the lead of the seam zone of the tubing, and thus of the shirring can be achieved by periodically changing the speed of rotation of the winding roll. This may, for example, be performed in a way such that at the two ends of the shirring the relatively thick seam zone of the casing has a lead which is different from the lead in the middle of the shirring.

The portion of the sausage casing which exhibits a different shirring density, resulting from the different speed of rotation of the sausage casing during winding, serves as a visible marker which indicates that a desired, predetermined length of casing has been reached and thus permits the cutting of the desired shirred casing length at the marked point during the shirring process. Shirring of the casing is performed at a uniform speed. After a predetermined length of casing has been shirred it is marked by a different lead of the helically twisted seam zone, which results from varying the speed of rotation. Such markings are, for example, used to designate the cut-off point, i.e. the point where a predetermined length of shirred casing is to be cut.

The shirring mandrel is a hollow tube which supports the tubular casing and defines the inner diameter of the shirred casing formed during the shirring process.

In addition, the shirring tube slightly inflates the casing in order to impart a taut shape to the casing as required for proper shirring by the shirring forces. Shirring is performed by means of known toothed wheels or endless belts carrying entrainment means. Preferably, the shirring member is a rotating sleeve which is provided with internal screw-type toothings and exerts an axially acting densifying force onto the tubing material. It is also possible to apply the shirring force by means of an air jet.

In another embodiment, the sausage casing is additionally rotated about the shirring mandrel, whereby the shirred folds are twisted into a screw-like pattern, this step being in addition to the prior helical twisting. This embodiment is not preferred, however, since the distance between the individual turns cannot be considerably reduced and, moreover, there exists the substantial danger that the casing is damaged by the attack of the deformation forces. Furthermore, no exact reproduction of the lead of the helically wound seam zone is possible in this embodiment.

If the sausage casing is, for example, intended for sensitive sausage mixtures or has a high water content, the web, the tubing or the shirred casing is sterilized using conventional methods, such as heat treatment or ozone treatment, high-frequency irradiation or treatment with chemical agents having a bactericidal, and in particular, a fungicidal effect.

Referring now to the figures, FIGS. 1a and 1b show the shirred tubular casing 1 having a helically twisted seam zone 2. In FIG. 1a, this seam zone 2 has a uniform lead, whereas the seam zone 2 of FIG. 1b has various leads. The shirring of FIG. 1b is produced from a tubing which, on winding, was twisted at various speeds of rotation.

In FIG. 2, the web 4 of cellulose, which is coated on both sides with an anchoring agent, is unwound from a roll 3, guided through a templet 5, where the two edges approach one another, and formed into a tubing 6 by means of a support tube 7 and a sleeve 8. The support tube 7 and the sleeve 8 support the inside and the outside of the tubing, thus facilitating the tube formation.

A strip of adhesive solution 10 is applied between the overlapped edge zones of the web 4, by means of a nozzle 11. After passing through the pair of draw rollers 12, 12' and deflecting rollers 13, the tubing is inflated between two pairs of intimately adjoining rollers 14, 14' and 15, 15' and wound onto the roll 16. The pair of rollers 15, 15' and the roll 16 are located on a common support 17 which is rotated by the drive motor 18, thus winding the tubing seam 2 onto the roll 16 in a helically twisted manner.

Figure 4:
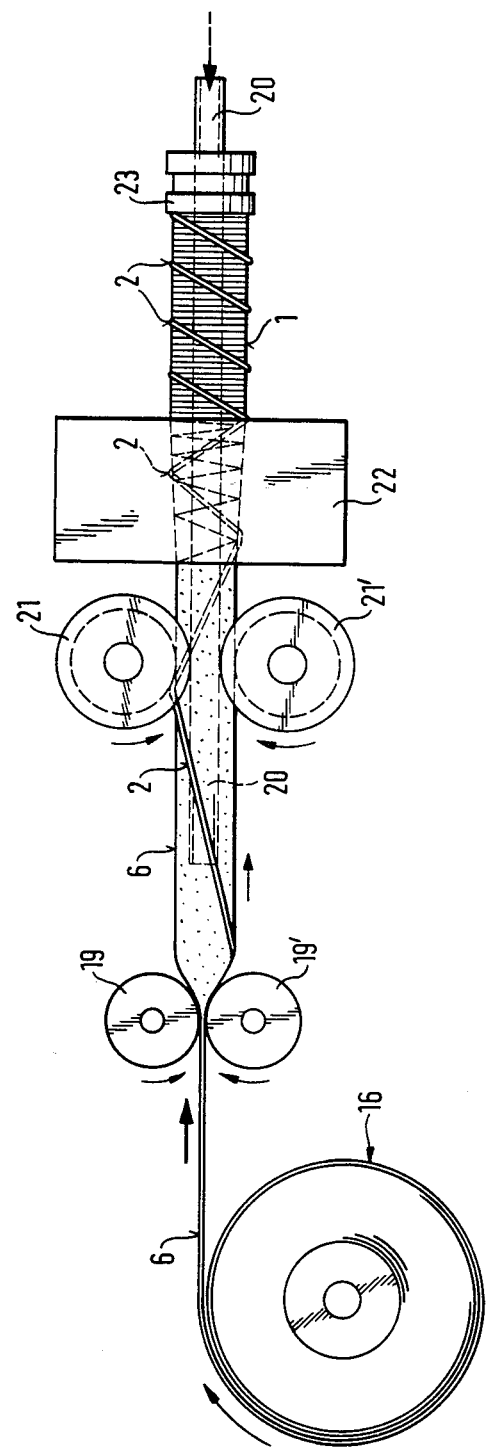
FIG. 4 is a schematic view illustrating the production of a shirred tubular casing, including the unwinding of a helically twisted wound tubing.

In FIGS. 3 and 4, the reference numerals denote the same items as in the preceding Figures. In FIG. 4, the tubing 6, which has been wound in a helically twisted manner, is unwound from the roll 16. After passing through the intimately adjoining rollers 19, 19', the tubing is kept in an inflated state, by air which is blown through the shirring mandrel in known manner. Through a further pair of driven rollers 21, 21', the inflated tubing is moved in the direction of the equipment 22, where the actual shirring process takes place. Reference number 23 designates a stop, against which the tubing is pressed to form the concertina 1.

The present invention is further explained by the following non-limiting examples.

EXAMPLE 1

Viscose was extruded through a gap into an acid coagulation bath. The web of cellulose hydrate gel obtained after regeneration was passed through a trough filled with an 0.3 percent by weight aqueous solution of a water-soluble cationic resin. The resin employed was a reaction product of ethylenediamine, adipic acid, diethylenetriamine and epichlorohydrin, which is commercially available under the name ®Resamin HW 601 (produced by Cassella) in the form of 12 and 20 percent by weight aqueous solutions. Thereafter, the web of cellulose hydrate gel was passed through a softener bath composed of a 9 percent by weight strength aqueous glycerol solution.

After drying at temperatures ranging from 90°–110° C., the resulting web of regenerated cellulose had a weight per unit area of 50 $g/m^2$, a water content of about 8 percent by weight and a glycerol content of about 20 percent by weight. When necessary, the water content was adjusted by remoistening. Each of the two web surfaces contained 20 $mg/m^2$ of the thermoset resin. The cellulose web obtained had a permeability to water vapor of about 700 $g/m^2 \cdot 24$ hours (DIN 53,122, determined gravimetrically), and the swelling value after 24 hours at room temperature was about 160 percent. The swelling value is that quantity of water which, in percent by weight relative to the cellulose web, can be absorbed by the web material. The swelling value was determined by a method which is described in "Färberei und textiltechnische Untersuchungen (Dyeing and Textile-Technological Investigations)", page 400, H. Agster, Springer-Verlag, Berlin, 1956. Moreover, the web material had a breaking strength of about 48 to 53 N/mm$^2$ in the transverse direction.

The cellulose web was cut into 60 mm wide tapes. By means of the equipment shown in FIG. 8 of European patent application No. 0,037,543, each cut piece in the form of tape was coated stripwise, along one of its two edges, in the longitudinal direction of the tape, with a 12 percent by weight aqueous solution (ph 7.5, adjusted with concentrated ammonia solution) of the above-described water-soluble cationic resin and formed into a tube.

For this purpose, the solution was transferred by means of a rotating applicator roller, having a width of approximately 2 mm, from a supply trough to the running film tape, the coating assuming a width of 2 to 3 mm with a wet layer thickness of 10 to 12 μm. The tape, which was coated near the edges, was formed into a tube having a diameter of 17 mm, by means of shaping aids, which gripped the outside and inside surfaces of the web, in such a way that the edge coated with the solution and the uncoated edge overlapped by 5 mm. The regions near the edge formed, in each case, an overlapped glued seam running in the longitudinal direction (see FIG. 1 of European patent application No. 0,037,543), the result being an adhesive layer corresponding to a weight per unit area of about 1 to 2 g/m$^2$. About 1 to 2 seconds after the formation of the overlapping seam, the tubing formed was laid flat, inflated between two pairs of draw rollers, helically twisted and laid flat again by the second pair of draw rollers, and subsequently wound onto a take up roll. The tubing was advanced at a speed of 50 m/min, the speed of rotation was 60 rpm.

After storage at room temperature for about 3 days, the glued area had a hot-water resistance of several hours, determined by immersing test specimens having a width of 15 mm and a clamping length of 50 mm in a suspension in hot water at 80° C. and loading their lower ends with a weight of 300 g each.

Tubular casings conditioned in a standard reference atmosphere (23° C., 50 percent relative humidity) had a tear resistance in the transverse direction of 50 N/mm$^2$ and a bursting pressure of more than 1 bar. Tubing immersed for 30 minutes in water at 40° C. had a bursting pressure of 0.35 to 0.45 bar. These values are sufficient for small-diameter sausage casings.

The tubular casings thus produced were shirred utilizing the device described in U.S. Pat. No. 4,185,358, the shirring ratio being 1:50. The resulting shirring had a helically wound seam, the distance between the individual turns being 1.7 cm.

The distance between the turns (cm) is calculated as follows:

$$\frac{\text{Tube advance speed on winding (m/min)} \times 100}{\text{Speed of rotation (rpm)} \times \text{shirring ratio}}$$

The shirring ratio is the quotient of original tubing length and shirring length and lies within the usual values, i.e., between 20 and 120.

The hollow space of the shirring was straight and had a smooth inner wall. The shirring was fitted onto the stuffing horn of a stuffing machine without any problems and uniformly filled with the sausage mixture. For stuffing, the typical sausage mixtures were used, for example, of the Frankfurt or Vienna type. The sausages obtained were smoked under known conditions and boiled at about 70° to 85° C. This gave small cooked sausages having a uniform typical red-brown smoked color. The glued seam withstood the forces arising during the processing.

If required, the tublar casing can be peeled from the sausage meat. Small sausages without a casing remain in a well-formed integral skin.

EXAMPLE 2

Example 1 was repeated, except that the adhesive used for the glued seam was a 12 percent by weight aqueous solution (pH 9) of a cationic polyamide resin available from Hercules under the name Kymene 557 H. The solution was transported from a pressurized stock vessel through a thin tubing to a coating nozzle, the orifice of which had a diameter of about 0.4 mm and which was positioned in the region of the forming head in such a way that the adhesive solution was released directly into the overlap region of the cellulose tape laid into the form of a tube. By selecting a suitable pressure, an approximately 1 to 3 mm wide track of the adhesive solution was continuously applied to the overlap region, to produce a tubing of bonded overlapped edge regions. The tubing obtained was immediately laid flat, helically twisted and wound onto a roll in the twisted state. The tube was advanced at a speed of 70 m/min, the speed of rotation during twisting was 150 rpm.

After storage at room temperature for 2 to 3 days, the tubing had a hot-water resistance of several hours.

The test was similar to that described in Example 1, wherein the tubing was cut transversely to the seam to form test specimens having a width of 15 mm and a clamping length of 50 mm. The test specimens were suspended in hot water having a temperature of 80° C. and loaded at their lower end with a weight of 300 g. For producing the shirred sausage casing, the twisted casing was unwound from the roll and passed to the shirring device described in U.S. Pat. No. 4,185,358. The shirring ratio was 1:100. On the shirring, the distance between the turns was 0.5 cm. The hollow space of the shirring was straight, and had a uniform diameter and a smooth inner wall, thus permitting problem-free application of the shirring onto the stuffing horn. The tubular casings produced in this way are especially suitable as smoke-permeable artificial sausage casings which are resistant to tearing, in particular for sausage mixtures of the type mentioned in Example 1.

EXAMPLE 3

Viscose was extruded through a gap into an acid coagulation bath. The web of cellulose hydrate gel obtained after regeneration and washing was then passed through a softener bath composed of a 9 percent by weight aqueous glycerol solution. After drying at about 85° to 90° C., the regenerated cellulose web had a weight per unit area of about 40 g/m$^2$, a water content of about 8 percent by weight and a glycerol content of about 20 percent by weight. The swelling value was about 153 percent, the tear resistance of the web material was 96 N/mm$^2$ in the longitudinal direction and 68 N/mm$^2$ in the transverse direction.

The cellulose web was cut into 58 mm wide tapes. A strip of one longitudinally extending edge of each of these tapes was coated with an adhesive solution (pH 7.5, adjusted with concentrated aqueous ammonia solution). The adhesive solution was comprised of 94 parts by weight of a 12 percent aqueous solution of the water-soluble cationic resin described in Example 1, 5 parts by weight of glycerol, and 1 part by weight of a red pigment dye paste (®Novofil BB 02, produced by Hoechst AG). As described in Example 2, the adhesive solution was released under pressure through a coating nozzle into the overlap region of the cellulose tape, thus bonding the edge regions of the tape to one another.

From the gluing station, the laid-flat, glued tubing having a diameter of 17 mm was directly conveyed at a speed of 100 m/min to a pair of intimately adjoining draw rollers. Having passed these rollers, it was inflated with supporting air, so as to assume a round shape, and passed on to a second pair of intimately adjoining draw rollers which rotated about the tube axis at a speed of 100 rpm, thereby helically twisting the tubing and laying it flat. The twisted, laid-flat tubing was conveyed to a winding station which also rotated.

The twisted, wound tubing was inserted into the unwinding device of a shirring apparatus, unwound and shirred. Rigid, straight shirrings were obtained having a shirring ratio of 1:80. The distance between the individual turns of the seam was 1.25 cm.

The casings were filled with typical sausage mixtures by conventional means, cut into portions, smoked and boiled to give boiled sausages. If required, the tubular casing can be peeled from the sausage meat.

EXAMPLE 4

A web of long-fibered hemp paper having a width of 235 mm and a weight per unit area of 21 g/m$^2$ was coated on both sides with viscose. The gap width was, for example, 0.8 mm and the web speed was 5 m/min.

A fluid suitable for precipitation and regeneration was then applied to the viscose-coated web. The web width was kept constant controlling the holding elements gripping the two web edges, so that the shrinkage in the transverse direction which usually occurs on regeneration, was prevented. The fiber-reinforced web of cellulose hydrate gel was then passed through washing and desulfurization baths. The web of cellulose hydrate gel then had a width of 210 mm.

The fiber-reinforced web of cellulose hydrate gel was drawn through a trough which contained a 3 percent by weight aqueous solution of the resin used in Example 1. Subsequently, the web was passed through a bath containing a 15 percent by weight aqueous glycerol solution.

The web was then pre-dried, during which the water content of the web was lowered to between about 80 and 150 percent by weight. Subsequently, the web edges were gripped by holding elements and the web was extended in the transverse direction to a width of about 252 to 262 mm. While held at this width, the web was dried, preferably at about 80° to 110° C. The residual moisture content of the wound web was about 14 percent by weight, and evidenced a tear resistance of 52 N/mm$^2$ in the longitudinal direction and 58 N/mm$^2$ in the transverse direction, an elongation at break of about 17.5 percent in both directions, a weight per unit area of about 100 g/m$^2$, and a glycerol content of about 21%. Layers of the cured, water-insoluble resin, each having a weight per unit area of about 0.5 to 1 g/m$^2$, were present on both surfaces. The permeability to water vapor was 650 g/m$^2$·24 hours. The maximum absorption of liquid water at room temperature after 24 hours (swelling value) was 140 percent.

The web of fiber-reinforced regenerated cellulose was cut into tapes having widths of 170 mm and passed through a tubular forming device having a diameter of 50 mm wherein the tape was formed into a tube having an overlap of the two edges of the tape of 13 mm. The tip of a fine nozzle protruded into this overlap to inject, under pressure, a 12 percent aqueous solution of the resin mentioned in Example 1, adjusted to a pH value of 7.5 with concentrated ammonia. This resulted in a 10 mm wide layer of adhesive solution in the overlap region having a wet layer thickness of about 10 μm, which mutually bonded the regions of the tape close to the edges. The continuously formed tubing was immediately laid flat, helically twisted and wound up in this twisted state, without altering the overlap edge regions. The tubing was advanced at a speed of 40 m/min, twisting was carried out at a speed of 40 rpm.

After storage for 2 days in a standard reference atmosphere, the glued seam had a hot-water resistance of more than 1 hour when test strips of 50 mm clamping length and 15 mm width, cut transversely to the seam, were immersed in suspension into hot water of 80° C. and loaded with a weight of 2,000 g. After soaking with water for 30 minutes in a water bath, the tubing had a bursting pressure of 1.2 bar.

In the tensile test, conditioned samples cut transversely to the seam had a breaking strength of about 57 to 58 N/mm$^2$ in the transverse direction, thereby equalling the original strength of the tubing material in the region of the seam.

The helically twisted, wound tubing was unwound and shirred by means of the shirring device described in U.S. Pat. No. 4,185,358, the shirring ratio being 1:50. The distance between the individual turns on the resulting concertina was 2 cm. Despite the rather thick glued seam, the concertina showed a relatively high density, and at the same time its hollow space had a smooth inner wall and a uniform cross section. The concertina was rigid and break-resistant and thus could be handled easily, in particular during transport and stuffing.

Using the customary sausage filling machine, the shirred tubing produced in accordance with this Example was filled with a cooked sausage mixture, e.g., Lyon sausage or lightly smoked sausage, and closed by tying or clipping. Subsequently, the sausages obtained were smoked in a conventional manner, for example, in moist smoke at 70° to 80° C. for 20 minutes, cooked for an additional 50 minutes in water at a temperature of about 80° to 82° C., and then cooled and stored in a cold chamber. In the case of salami fillings, the sausages were smoked and dried.

After initial cutting, the sausage casings could be peeled from the sausages without effort. Moreover, even in the seam region, the sausages evidenced a uniform smoked coloration. The glued seam withstood the mechanical and thermal stresses during processing and storage.

What is claimed is:

1. A shirred sausage casing, comprising a circular cylindrical casing of a web film having a seam region, formed from the edge regions of said web film, comprising an adhesive layer and extending in a helically twisted manner about the longitudinal axis of the shirred casing, wherein the number of helical turns of said seam region is greater than about 15 turns per 10 m of tube length.

2. A shirred sausage casing, comprising a circular cylindrical casing of a web film having a seam region, formed from the edge regions of said web film, comprising an adhesive layer and extending in a helically twisted manner about the longitudinal axis of the shirred casing, wherein the number of helical turns of said seam region is greater than about 15 to 30 turns per 10 m of tube length.

3. A shirred casing as defined in claim 1, wherein said seam region further comprises an anchoring agent contacting both said web film and said adhesive layer.

4. A shirred casing as defined in claim 1, wherein said web film comprises cellulose.

5. A shirred casing as defined in claim 4, wherein said web film comprises fiber-reinforced cellulose.

6. A shirred casing as defined in claim 1, wherein said casing comprises a smoke permeable material.

7. A shirred casing as defined in claim 1, wherein said casing comprises an internal hollow space having a circular cross section and said helically twisted seam region protrudes outwardly from the outside surface of said casing.

8. A shirred casing as defined in claim 1, wherein said seam region further comprises a dyestuff.

9. A shirred casing as defined in claim 1, wherein said edge regions overlap and are bonded by said adhesive layer.

10. A shirred casing as defined in claim 9, wherein said seam region further comprises at least one film strip for bonding said overlapped edge regions.

11. A shirred casing as defined in claim 1, wherein said edge regions abut one another and are joined by at least one film strip which covers both edge regions.

12. A shirred casing as defined in claim 7, wherein said helical turns on the outside of said casing have a uniform lead.

13. A shirred sausage casing as defined in claim 1, wherein the number of helical turns is between about 15 and 40 turns per 10 m of tube length.

14. A shirred sausage casing as claimed in claim 1, wherein the casing comprises a substantially uniform outer circumference and a substantially uniform, circular inner circumference.

15. A shirred sausage casing comprising a circular cylindrical casing of a web film having a seam region, formed from the edge regions of said web film, comprising an adhesive layer and extending in a helically twisted manner about the longitudinal axis of the shirred casing, wherein the number of helical turns of said seam region is greater than about 15 turns per 10 m of tube length, produced by the process comprising the steps of:

forming a web film into a tubing by bending the edge regions of said film along the film's longitudinal axis;

bonding said edge regions of said formed tubing;

helically twisting said tubing;

passing said tubing in said helically twisted state to a shirring mandrel supplied with an internal gas pressure; and pressing said tubing against a stop at said shirring mandrel to form the shirred casing.

* * * * *

UNITED STATES PATENT AND TRADEMARK OFFICE
CERTIFICATE OF CORRECTION

PATENT NO. : 4,562,101

DATED : Dec. 31, 1985

INVENTOR(S) : ANDRAE et al.

It is certified that error appears in the above—identified patent and that said Letters Patent is hereby corrected as shown below:

IN THE BIBLIOGRAPHICAL DATA:

At item [19] and [75] INVENTORS: Kindly correct the first inventor's name to read

-- ANDRAE --

Item [75] correct the second inventor's name to read

--Hutschenreuter--.

Signed and Sealed this

Eighth Day of April 1986

[SEAL]

Attest:

DONALD J. QUIGG

Attesting Officer

Commissioner of Patents and Trademarks